(12) United States Patent
Denenberg et al.

(10) Patent No.: US 11,766,780 B2
(45) Date of Patent: *Sep. 26, 2023

(54) SYSTEM IDENTIFICATION OF INDUSTRIAL ROBOT DYNAMICS FOR SAFETY-CRITICAL APPLICATIONS

(71) Applicants: Scott Denenberg, Newton, MA (US); Brad C. Mello, Cambridge, MA (US); Matthew Galligan, Boston, MA (US); Clara Vu, Cambridge, MA (US); Patrick Sobalvarro, Harvard, MA (US); Marek Wartenberg, Westbrook, ME (US); Alberto Moel, Cambridge, MA (US)

(72) Inventors: Scott Denenberg, Newton, MA (US); Brad C. Mello, Cambridge, MA (US); Matthew Galligan, Boston, MA (US); Clara Vu, Cambridge, MA (US); Patrick Sobalvarro, Harvard, MA (US); Marek Wartenberg, Westbrook, ME (US); Alberto Moel, Cambridge, MA (US)

(73) Assignee: VEO ROBOTICS, INC., Waltham, MA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/569,742

(22) Filed: Jan. 6, 2022

(65) Prior Publication Data

US 2022/0126449 A1    Apr. 28, 2022

Related U.S. Application Data

(63) Continuation of application No. 16/553,744, filed on Aug. 28, 2019, now Pat. No. 11,254,004.

(Continued)

(51) Int. Cl.
    B25J 19/06    (2006.01)
    B25J 9/16     (2006.01)
    B25J 13/08    (2006.01)

(52) U.S. Cl.
    CPC ............. *B25J 9/1674* (2013.01); *B25J 13/08* (2013.01)

(58) Field of Classification Search
    CPC ...... B25J 13/088; B25J 9/1653; B25J 9/1666; B25J 9/1674; G05B 2219/40203;
    (Continued)

(56) References Cited

U.S. PATENT DOCUMENTS 5,357,424 A    10/1994  Kakizaki et al.
5,936,367 A     8/1999  Takenaka
(Continued)

FOREIGN PATENT DOCUMENTS

JP    2010-208002 A    9/2010
WO    WO 2018/148181    8/2018

OTHER PUBLICATIONS

Dynamic Model Identfication for Industrial Robots, IEEE Control Systems Magazine, IEEE, Oct. 2007, 58-71, by Jan Swevers, et al.
(Continued)

*Primary Examiner* — Dalena Tran
(74) *Attorney, Agent, or Firm* — Morgan, Lewis & Bockius LLP

(57) ABSTRACT

Embodiments of the present invention provide automated robotic system identification and stopping time and distance estimation, significantly improving on existing ad-hoc methods of robotic system identification. Systems and methods in accordance herewith can be used by end users, system integrators, and the robot manufacturers to estimate the dynamic parameters of a robot on an application-by-application basis.

18 Claims, 1 Drawing Sheet

Related U.S. Application Data

(60) Provisional application No. 62/724,947, filed on Aug. 30, 2018.

(58) Field of Classification Search
CPC ........... G05B 2219/49138; G05B 2219/40201; G05B 2219/40317
USPC ................ 700/255, 245, 250, 262; 702/183; 901/46, 49
See application file for complete search history.

(56) References Cited

U.S. PATENT DOCUMENTS

| | | | |
|---|---|---|---|
| 9,452,531 | B2 | 9/2016 | Kikkeri et al. |
| 9,981,383 | B1 | 5/2018 | Nagarajan |
| 10,445,944 | B2 | 10/2019 | Galera et al. |
| 10,576,620 | B1* | 3/2020 | Chou ................... A61F 5/0102 |
| 11,351,680 | B1* | 6/2022 | Rosenberg ........... B25J 19/0095 |
| 2006/0004489 | A1 | 1/2006 | Weiss |
| 2011/0050878 | A1* | 3/2011 | Wells .................... H04N 7/181 348/86 |
| 2011/0060462 | A1 | 3/2011 | Aurnhammer et al. |
| 2013/0345875 | A1 | 12/2013 | Brooks et al. |
| 2016/0354927 | A1 | 12/2016 | Kikkeri et al. |
| 2017/0274528 | A1 | 9/2017 | Inaba et al. |
| 2017/0302905 | A1 | 10/2017 | Shteinfeld et al. |
| 2018/0036891 | A1 | 2/2018 | Monsarrat et al. |
| 2018/0079090 | A1* | 3/2018 | Koenig ..................... G01L 1/14 |
| 2018/0081340 | A1 | 3/2018 | Haddadin et al. |
| 2019/0262991 | A1 | 8/2019 | Sugiyama et al. |
| 2019/0262993 | A1 | 8/2019 | Cole et al. |
| 2020/0164516 | A1 | 5/2020 | Lehment et al. |

OTHER PUBLICATIONS

Japanese Office Action, Patent Application No. 2021-510935, dated May 10, 2022, 6 pages.

Swevers, J. et al. "Dynamic Model Identification for Industrial Robots", IEEE Control Systems Magazine, IEEE Service Center, Piscataway, NJ, US, vol. 27, No. 5, Oct. 1, 2007 (Oct. 1, 2007), pp. 58-71, XP011192375, ISSN: 0272-1708, DOI: 10.1109/MCS.2007.904659.

* cited by examiner

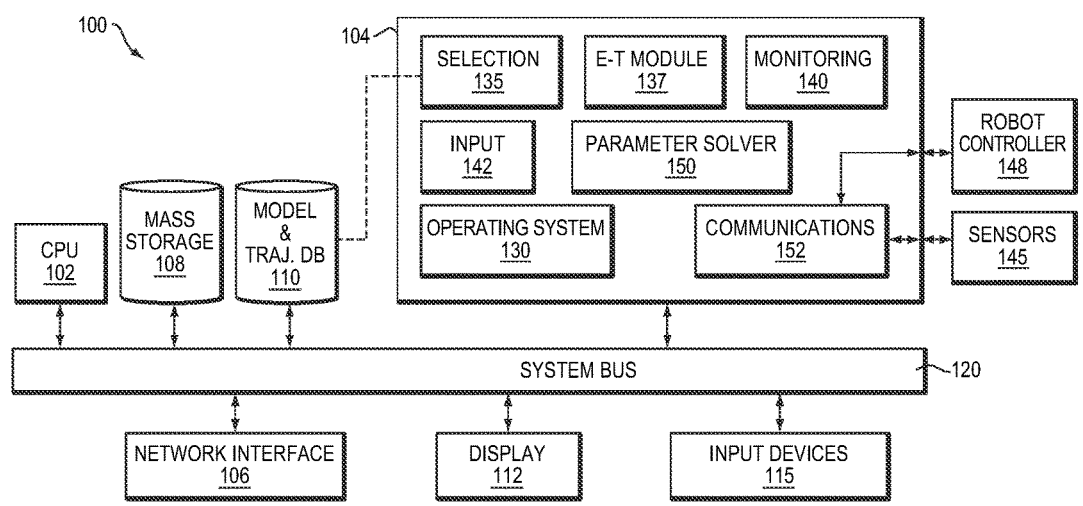

SYSTEM IDENTIFICATION OF INDUSTRIAL ROBOT DYNAMICS FOR SAFETY-CRITICAL APPLICATIONS

CROSS-REFERENCE TO RELATED APPLICATIONS

This application is a continuation of U.S. Ser. No. 16/553,744, filed on Aug. 28, 2019, which claims priority to and the benefit of, and incorporates herein by reference in its entirety, U.S. Provisional Patent Application No. 62/724,947, filed on Aug. 30, 2018.

FIELD OF THE INVENTION

The field of the invention relates, generally, to robot safety, and in particular to systems and methods for characterizing robot operation in order to ensure safe robot operation in industrial and other environments.

BACKGROUND

Industrial robots are widely deployed in modern manufacturing to save costs, increase productivity and quality, to eliminate dangerous, laborious, or repetitive work, or to augment human capability through the robot's strength, speed, reliability, and lifetime. The recent trend toward increased human-robot collaboration in manufacturing workcells imposes particularly stringent requirements on robot performance and capabilities. Traditional industrial robots are dangerous to humans and are usually kept separate from humans through guarding—e.g., robots may be surrounded by a cage with doors that, when opened, cause an electrical circuit to place the machinery in a safe state. Other approaches involve light curtains or 2D area sensors that slow down or shut off the machinery when humans approach it or cross a prescribed distance threshold. Of course, these systems prevent all interaction between human and machine, and severely constrain collaborative use of the workspace.

On the other hand, having humans and robots operate in the same workspace places additional demands on robot performance. Both may change position and configuration in rapid and uneven ways, putting additional performance requirements on the robot's response times, kinematics, and dynamics. Typical industrial robots are stationary, but nonetheless have powerful arms that can cause injury over a wide "envelope" of possible movement trajectories and having precise knowledge of these trajectories in spaces where humans are present is fundamental to safe operation.

Relatively new applications such as precision machining, laser welding, laser cutting, and multi-robot collaboration also demand higher dynamic performance from robotic tools. For example, in robotic laser welding, workpieces are welded with a focused high-power laser beam. The manipulator has to move the focus of the high-power laser beam along a weld seam at high speeds (sometimes faster than 50 mm/s) with micron-level accuracy throughout the entire welding process. At these speeds, the dynamic response time of traditional industrial robot controllers may be too slow for the laser welding task, and more sophisticated control systems are required to meet these speed and precision specifications. Even higher precision and accuracy is required for applications such as robotic surgery.

Another factor driving higher performance is the trend toward lightweight robot structures, where the robot weight is reduced but not the payload capacity, which remains comparable to those of stiffer and heavier robots. This is motivated by cost reduction as well as safety concerns but results in a more compliant mechanical structure with enhanced elastic effects. Precisely controlling the trajectories of such robots is more difficult, and hence more sophisticated control methodologies are needed.

In general, robot arms comprise a number of mechanical links connected by rotating joints that can be precisely controlled, and a controller coordinates all of the joints to achieve trajectories that are determined and programmed by an automation or manufacturing engineer for a specific application. Systems that can accurately control the robot trajectory are essential for safety in collaborative human-robot applications. However, the accuracy of industrial robots is limited by factors such as manufacturing tolerances (e.g., relating to fabrication of the mechanical arm), joint friction, drive nonlinearities, and tracking errors of the control system. In addition, backlash or compliances in the drives and joints of these robot manipulators can limit the positioning accuracy and the dynamic performance of the robot arm, since compliances in the robot arm decrease the maximum bandwidth of the control system.

Kinematic definitions of industrial robots, which describe the total reachable volume ("joint space") of the manipulator, are derived from the individual robot link geometry and their assembly. A dynamic model of the robot is generated by taking the kinematic definition as an input, adding to it information about the speeds, accelerations, forces, and moments that the robot is capable of at each joint interface, and applying a system identification procedure to estimate the robot dynamic model parameters. Accurate dynamic robot models estimated from system identification procedures are needed in many areas, such as mechanical design, workcell and performance simulation, control, diagnosis, safety and risk assessment, and supervision.

For example, robot-assisted surgery requires an accurate model of the robotic system for preoperative planning, surgical operation simulations and training A good model for a welding application will facilitate accurate prediction of the welding tip position and speed at the end of a robotic arm. Tip predictions can be used for offline programming to decide whether or not a robot can perform a welding task within the required tolerance—an analysis that would otherwise require costly machine time for tests on production facilities. In collaborative applications, knowing stopping distances under a large number of starting payloads, speeds, and poses is critical for fluid, safe, and intuitive human-robot interaction.

System identification involves building mathematical models of dynamic systems using measurements of the system's input and output signals to estimate the parameters that define the system. A methodology for system identification involves first selecting a model structure, which is a mathematical relationship between a system's input and output variables, and then using experimental measurements from the dynamic system to estimate the model parameters. Models of dynamic systems include difference or differential equation models with arbitrary parameters, transfer functions with adjustable poles and zeros, and state-space equations with unknown system matrices.

One simple dynamic system that can be analyzed in this manner is an object on a spring. Here the mathematical model is a second-order linear differential equation that includes, as dynamic parameters, the mass of the object and the spring constant (stiffness) of the spring. Measurements of force (input) and displacement (output) of the system allow for estimation of the dynamic parameters.

Robotic system identification is system identification for robots and, more typically, robotic arms. This is much more complicated than a simple spring system, as robots have many joints and many parameters that define the system dynamics, but the principles are analogous. The kinematic definition of the robot is used as the initial model to determine the mechanical relationships and physical constraints between the robot links and joints. This kinematic definition is then used to estimate the robot dynamic parameters.

There are a number of ways to estimate robot dynamic parameters based on experimental measurements of the dynamic system inputs and outputs. Linear least-squares estimation methods and maximum-likelihood estimation methods are popular approaches. Other approaches include the extended Kalman filter, nonlinear least-squares optimization, and instrumental variable approaches. All of these methods are well-specified in the literature.

Once the parameters are estimated, the resulting model can be evaluated against actual system performance to determine if the model is adequate for the application. The parameter values are accurate within a confidence region, and the size of this region is determined by the values of the parameter uncertainties computed during estimation. The magnitude of the uncertainties provides a measure of the reliability of the model.

Once estimated, robot model parameters can be used to compute stopping distances and other safety-related quantities. Because robot links are typically large and heavy metal castings fitted with motors, they have significant inertia while moving. Depending on the initial speed, payload, and robot orientation, a robot can take a material amount of time (and travel a great distance, many meters is not unusual) to stop after a stop command has been issued. These stopping distances are inputs to calculating the minimum distances required for placing safety guarding around the robot. In collaborative applications (such as those in Speed and Separation Monitoring, SSM, described in ISO 10218-1), the stopping distances are inputs to the Protective Separation Distance (PSD). The PSD is the minimum distance separating a robot from a human, and if a human and robot come closer than the PSD, a stop command needs to be issued to the robots.

Safety standards require robots to be designed with safe stopping functions. In ISO 10218-1, robot manufacturers are mandated to implement stopping functions from ISO 60204. There are three types of safe stops mandated by the standards: Category 0, Category 1, and Category 2. Category 0 stops cut all power from the servo motors, halting motion as fast as possible with no guarantee of maintaining a preprogrammed trajectory. A Category 1 stop decelerates the robotic manipulator in a controlled manner, usually following the robot's preprogrammed trajectory, until it stops, cutting off power to the motors. A Category 2 stop also decelerates the robotic manipulator along its trajectory, while keeping the servo motors powered on after stopping. In a Category 2 stop, the robot remains ready to resume its motion after a Category 2 stop instruction has been lifted, while resuming after a Category 0 or Category 1 stop usually requires operator acknowledgement of overall cell safety. In addition to the stop-function implementation requirement, the ISO 10218-1 standard also mandates that robot manufacturers publish certain information related to the stopping times and distances of their robots for the Category 0 and Category 1 stops. The stopping distance is defined as the total distance travelled after the initiation of a stop signal, with distance specified in linear or angular units as appropriate.

As robot applications become more sophisticated (requiring higher dynamic performance) and robots become lighter and more compliant, accurately modeling the dynamics of robot manipulators increases in importance among researchers, end users, system integrators, and robot manufacturers. Dexterous manipulation tasks and interaction with the environment, including humans in the vicinity of the robot, demand accurate knowledge of the dynamic model of the robot for a specific application.

The dynamic models of robot arms are represented in terms of various inertial and friction parameters that must be either measured directly or determined experimentally. While the model structure of robot manipulators is well known, the parameter values needed for system identification are not always available, since dynamic parameters are rarely provided by the robot manufacturers and often not directly measurable. Determination of these parameters from computer-aided design (CAD) data or models may also not yield a complete representation because they may not include dynamic effects like joint friction, joint and drive elasticities, and masses introduced by additional equipment such as end effectors, robot payloads, or the robot dress package.

One important need for effective robotic system identification is in the estimation of joint acceleration characteristics and robot stopping distances for the safety rating of robotic equipment. As humans physically approach robotic arms, safety systems will engage and cut or reduce power to the arm, but robot inertia can keep the robot arm moving. The effective stopping distance (measured from the engagement of the safety system, such as a stopping command) is an important input for determining the safe separation distance from the robot arm given inertial effects. Similarly, all sensor systems include some amount of latency, and joint acceleration characteristics determine how the robot's state can change between measurement and application of control output. The different kinds of stop categories (Category 0, 1, and 2) described above result in different stopping distances, which are further affected by the end effector, payload, robot dress package, and manipulability of the robot from the pose at which the stop was initiated.

Robot manufacturers usually provide curves or graphs showing stopping distances and times, but these curves can be difficult to interpret, may be sparse and of low resolution, tend to reflect specific loads, and typically do not include acceleration or indicate the robot position at the time of engaging the stop. The standards require the reporting of stopping times and distances at 33%, 66% and 100% of the maximum speeds, extensions, and payloads for the robot; or only at 100% of each condition if an equation is provided to calculate the 33% and 66% cases from that dataset. Robot manufacturers also are not currently mandated to provide stopping time and distance information for Category 2 stops. Category 2 stops, by virtue of keeping the robot motors powered on upon stopping, have much lower latency on restart and hence better suited to fluid and safe human-robot collaboration.

Because of their incomplete nature, these curves are usually used only as conservative guidance in determining safe and hazardous robot workspace zones, and not for system identification or designing safe collaborative human-robot applications. Their fragmented and incomplete nature generally forces the end user, systems integrator, safeguarding device manufacturer, or risk assessment professional to be overly conservative when implementing separation distances between robots and guarding equipment. As a result, distances allowed between robots and humans tend to be larger than needed for safe interaction, reducing the fluidity and hindering safe human-robot collaboration.

Furthermore, excessive robot use at or near maximum payload and speed, accumulated Category 0 safety stops (which could involve mechanical braking), and general wear over time can reduce the stopping performance below that which is provided by the manufacturer, leading to potentially unsafe conditions. Lastly, traditional system identification methods are cumbersome to use and generate parameters that often must be further analyzed and mapped for practical applications. These parameters are generally static and fixed as part of the system identification output, and hence are unsuited for applications where a dynamic real-time parameter structure is needed, such as those where the robot trajectory changes dynamically in response to human behavior. For example, a system identification procedure may generate the weights for the dynamic equations of robot motion, but what are really needed are stopping times and distances for a specific application. The mapping of one set of parameters to the other is not a trivial task.

An improved approach to modeling and predicting robot dynamics under tighter constraints and differing environmental conditions (such as varying payloads and end effectors) is therefore needed. System identification capable of use on an application-by-application basis and in production environments, using simple and robust inputs and outputs that can be interpreted by manufacturing and robotic engineers, would expand opportunities for collaborative robot use without compromising safety.

SUMMARY

As explained above, in traditional robotic system identification, the objective is to determine a dynamic model of the robot to characterize joint velocities and accelerations for arbitrary excitation inputs with arbitrary robot joint angle and axis speed initial conditions. These velocities and accelerations depend on the inertial parameters of the robot links, on highly nonlinear phenomena (such as friction which is parameterized by kinetic and static friction coefficients) at the robot joints, and on the static and dynamic characteristics of the end effectors, payload, and robot dress package.

It is found, however, that direct measurements of such characteristics may be impractical, unnecessary for real-world applications, or even impossible in many cases. Inertial parameters of robot links cannot be measured without dismantling the robot arm, while highly nonlinear phenomena such as friction at robot joints cannot be directly quantified. Hence, in accordance with the present approach, experimental system identification using the assembled robot in realistic operating conditions is employed to determine accurate values for the parameters. It is further found that full estimation of the relevant parameters may not be necessary for a specific application, and it is possible to limit the system identification to a subset of the parameters that would be most relevant and helpful for the application. For example, in general collaborative applications applying SSM per ISO 10218-1, the most important outputs from the system identification process are robot stopping distances and times given application-specific joint or tool center point (TCP) positions and velocities.

In contrast to traditional robotic system-identification procedures that involve choosing a model structure, a robotic excitation trajectory design, data measurement, signal processing, parameter estimation, and model validation, experimental robotic system identification in accordance herewith may estimate dynamic robot parameters based on motion and force or torque data that are measured during robot motions along known excitation trajectories. These techniques may exploit the fact that the dynamic robot model can be written as a linear set of equations with the dynamic parameters as unknowns. A formulation such as this allows the use of linear estimation techniques that find the optimal parameter set in a global sense.

Embodiments of the present invention provide automated robotic system identification and stopping time and distance estimation, significantly improving on existing ad-hoc methods of robotic system identification. Systems and methods in accordance herewith can be used by end users, system integrators, and the robot manufacturers to estimate the dynamic parameters of a robot on an application-by-application basis.

Accordingly, in one aspect, the invention relates to a system for generating a system identification for a robotic system. In various embodiments, the system includes a processor; and a memory including (i) a database of robot kinematic and dynamic models and (ii) instructions executable by the processor for providing (a) a selection module configured to receive one or more robot characteristics selected from an identification of the robotic system, a type of workpiece, a type and/or model of end effector, or a robot dress package and, based on the robot characteristic(s), identify one or more robot models from the database; (b) an excitation-trajectory module, responsive to the selection module, for generating, based on the identified robot model (s), a set of robot motions, and causing the robotic system to execute the set of robot motions; (c) a monitoring module for monitoring the execution of the robot motions by the robotic system; and (d) a parameter solver, responsive to the excitation-trajectory module, for numerically estimating dynamic model parameters for the selected robot model(s) based on the monitored execution.

The system may further include an input module for receiving and timestamping data from a robot controller and external sensors monitoring operation of the robotic system. In addition, the parameter solver may be further configured to output dynamic model parameters to a safety-rated portion of a robot controller. In one embodiment, the system further includes a functional-safety compliant communications interface for data transfer with the robotic system. In some embodiments, the excitation-trajectory module is configured to monitor the execution of the robot motions by the robotic system by monitoring real-time outputs thereof.

The system may further include a motion capture system; the monitoring module is then configured to monitor the execution of the robot motions by the robotic system via the motion capture system. In some embodiments, the parameter solver is further configured to produce stopping distance curves for the specified robot application based on the dynamic model parameters and robot characteristic(s). In addition, the selection module may be further configured to receive a user-specified robot application; the robot model(s) may be identified at least in part based on the user-specified robot application.

In various embodiments, the excitation-trajectory module is further configured to generate the set of robot motions based at least in part on a user-specified robot application, one or more user-specified trajectories, and/or one or more user-specified system-identification criteria. Additionally or alternatively, the excitation-trajectory module may be further configured to select from among multiple robot models identified by the selection module based on the monitored execution of the robot motions.

In another aspect, the invention pertains to a method of computationally generating a system identification for a robotic system. In various embodiments, the method includes the steps of receiving and storing one or more robot characteristics selected from an identification of the robot, a type of workpiece, a type and/or model of end effector, or a robot dress package and, based on the robot characteristic(s), identify one or more robot kinematic and dynamic models from the database; computationally generating, based on the identified robot model(s), a set of robot motions, and causing the robotic system to execute the set of robot motions; monitoring the execution of the robot motions by the robotic system; based on the monitored execution, numerically estimating dynamic model parameters for the selected robot model(s) based on the monitored execution; and enforcing a safety constraint by operating the robotic system based on the estimated dynamic model parameters.

The method may further include the step of receiving and timestamping data from a robot controller and external sensors monitoring operation of the robotic system. In addition, the method may include monitoring real-time outputs of the robotic system. In one embodiment, the method further includes the step of monitoring the execution of the robot motions using a motion capture system. In some embodiments, the method further includes the step of producing stopping distance curves for the specified robot application based on the dynamic model parameters and robot characteristic(s). In addition, the method may further include the step of receiving and storing a user-specified robot application; the robot model(s) may be identified at least in part based on the user-specified robot application.

The set of robot motions may be generated based at least in part on a user-specified robot application, one or more user-specified trajectories, and/or one or more user-specified system-identification criteria. In addition, the robot model(s) may be identified based at least in part on the monitored execution of the robot motions.

In general, as used herein, the term "robot" means any type of controllable industrial equipment for performing automated operations—such as moving, manipulating, picking and placing, processing, joining, cutting, welding, etc.—on workpieces. The term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the single FIGURE of the drawing, which schematically illustrates a system-identification architecture in accordance with an embodiment of the invention.

DETAILED DESCRIPTION

Embodiments of the present invention provide systems and methods for automated robotic system identification and estimation of stopping time and distance, significantly improving on existing ad-hoc methods of robotic system identification, which may be inaccurate, incomplete, hard to interpret, or cumbersome to implement. The approach described herein can be used by end users, system integrators, and the robot manufacturers to estimate the dynamic parameters of a robot on an application-by-application basis.

With reference to FIG. 1, a representative system 100 includes a processor 102 (e.g., a CPU microprocessor) and associated system memory 104, a network interface 106 (for connection to a local network and/or the Internet), and one or more non-volatile digital storage elements (such as a hard disk, CD, DVD, USB memory key, etc.) and associated drives 108. A model and trajectory database 110, described in greater detail below, may be stored locally as, for example, a disk partition of the mass-storage device 108, or may be stored remotely and accessed via the network interface 106. The system 100 includes user input/output devices such as a display screen 112 and conventional tactile input devices 115 such as a keyboard and mouse or touch pad. The various components communicate with each other via one or more system buses 120.

In operation, the processor 102 executes one or more computer programs (conceptually illustrated as program modules) stored in the system memory 104. An operating system 130 (such as, e.g., Microsoft Windows, UNIX, LINUX, iOS, or Android) provides low-level system functions, such as file management, resource allocation, and routing of messages from and to hardware devices and one or more higher-level applications including a selection module 135, an excitation-trajectory (E-T) module 137, and a monitoring module 140. An input module 142 receives data from a plurality of external sensors 145 associated with a robot controlled by a robot controller 148. The input module 142 may also include interface functionality for generating screen displays and receiving user input via the input devices 115, e.g., by the user's typing on the keyboard, moving the mouse, or clicking with the mouse on a displayed screen. A parameter solver 150 generates numerical estimates of dynamic model parameters and associated confidence intervals. These numerical estimates can be presented graphically or in tabular format via the display 112 and can be used as input to the E-T module 137 to improve robot performance. A communication module 152—which may be, for example, a conventional real-time, low-latency Ethernet communication layer—receives data from the sensors 145 and the robot controller 148 and makes the data available for processing by the input module 142.

The functional modules 135, 137, 140, 142, 150 may be realized in hardware and/or software, and in the latter case may be coded in any suitable programming language, including, without limitation, high-level languages such as C, C++, C#, Java, Python, Ruby, Scala, and Lua, utilizing, without limitation, any suitable frameworks and libraries such as TensorFlow, Keras, PyTorch, or Theano. Additionally, the software can be implemented in an assembly language and/or machine language directed to a microprocessor resident on a target device. The processor 102 may be or include any suitable type of computing hardware, e.g., a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

In operation, the selection module 135 allows users to optionally select, via the display 112 and input devices 115, initial mathematical models—for example, the user may be allowed to select a model from the database 110, or specify a new model—that characterize the dynamics of a robot under study. The mathematical models typically include or consist of a set of second-order, nonlinear differential equations based on robot geometries, architectures, robot model numbers, and applications. In some embodiments, the database 110 stores model parameters for widely used robot arms. The selection module 135 can take as input an identification of the robot, the type of workpiece, the type and/or model of end effector, and/or the dress package. Based on this input, the module 135 may select candidate mathematical models (i.e., sets of non-linear differential equations characterizing the robot kinematics) for system identification from the database 110 based on the robot geometries, such as the number of joints and payload weights. Alternatively or in addition, the selection module 135 may receive configuration files from the user via the network interface 106 and use these to instantiate one or more of the stored models; the configuration files may specify the range of possible models for a given robot version, for example.

In addition, the selection module 135 may allow the user to specify a particular application in which the robot under study is intended to be used. The database 110 may include specifications of one or more test trajectories associated with specific applications (i.e., not only with specific robot models), which are retrieved and used as described below. For example, a welding application will require a certain characteristic set of motions and ability of the robot to stop precisely at the weld point, and these requirements are incorporated into the system-identification procedure as described in greater detail below. In various embodiments, the selection module 135 further allows the user to specify particular trajectories to be used during system identification—e.g., trajectories of importance to an intended use but not associated with any applications in the database 110. Finally, the selection module 135 may permit the user to specify attributes of the system identification, e.g., a narrower form of identification such as determining stopping times and distances for a specific application and payload.

The input module 142 manages incoming data from the external sensors 145 via the communications module 152. The sensors 145 sense and communicate data relevant to the operation of the robot under study. The input module 142 stores and timestamps this input data and, because multiple sensor types may be utilized concurrently in addition to data collected directly from the robot controller during the system-identification process, can calibrate timestamps for incoming sensor data to the actual robot motion. The communications module 152 is desirably designed to be functionally safe; in fact, any modules running in real time, including the parameter solver 150, will ideally be functionally safe.

A calibration procedure can include, for example, cycling a predefined trajectory with timestamped positions known to each sensor and determining the offset between each sensor's individual timestamp, or using an external input along with known latencies for each sensor type to trigger synchronous data collection. For example, the sensors 145 may include one or more cameras that monitor the actions of the robot under study and, using conventional computer-vision capability, provide motion-capture data characterizing movement of the robot and its joints for kinematic analysis. Other sensors used for system identification may include accelerometers, inertial measurement units (IMU), force or torque sensors, or any sensor providing information on the current kinematic or dynamic state of the robot. These sensors, in addition to the robot controller 148, can provide position data in the form of encoder pulses, degree or radian displacement from a joint home location, or velocity data in the form of encoder pulses, degrees or radians per second, or TCP position or velocity with respect to any desired coordinate frame (e.g., robot base, tool tip, externally defined world frame, etc.).

These positions or velocities can be recorded throughout one of the pre-selected trajectories from the database 110, or throughout the execution of a programmed trajectory developed for a specific application. In either case, the system 100 can collect position and velocity, take as input the load including end-effector, payload, robot dress package or any additional tooling, and perform a series of stops at different velocities throughout the trajectory, where a larger subset of positions, velocities and loads tested would lead to a more accurate overall model of robot stopping time and distance. It should be recognized that identification using a predefined trajectory from the database may require movements of the robot that would collide with workcell or application-specific fixtures in place. Accordingly, the procedure may be performed during robot or workcell commissioning, before fixtures have been put in place. The benefits of this approach include a more accurate overall model of the robot over a wider range of its working envelope. If, however, system identification is performed on a robot inside a partially or fully developed workcell application, a subset of trajectories from the database, manually or automatically checked to be free from collisions, can be run to achieve a description of the robot's capabilities that, while not complete, nonetheless covers a wider range of motion than that required by a specific application.

The most practical benefits of system identification typically arise from having the robot execute an application or task in a fully defined workcell, performing all application-specific trajectories. In this scenario, the path the robot will repetitively take can be monitored by the monitoring module 140, which may record, for example, the maximum velocities at for each joint during the task be recorded, and the robot can be iteratively stopped at each location throughout the trajectory to establish a "worst-case scenario" of stopping for each joint of the robot at any time during performance of the task. A more robust model, providing more accurate stopping data throughout the entire task, can be developed by adding iterative stopping at locations for each joint at a subset of conditions below its maximum velocity.

The E-T module 137 signals the robot controller 148 to run the robot under study through a series of test trajectories selected by the E-T module 137 and communicated to the robot controller to determine the parameters that best fit the candidate model. These test sequences may include predetermined motions that are applied to all robots as well as (i) trajectories associated with a particular robot model (or robot version, taking account of singularity conditions associated with that version); (ii) trajectories and motions associated with a particular application specified by the user; (iii) trajectories expressly specified by the user; and/or (iv) trajectories aimed at narrower identification criteria, such as determining a stopping time given a specified payload and trajectory sequence. The test sequences cause the robot to execute trajectories selected directly by the user or selected by the E-T module 137 from the database 110 given user-specified criteria. The E-T module 137 may be programmed not only to select trajectories but also to retrieve multiple compatible models from the database 110, determining the best-fit model based on robot performance over the selected trajectories. Depending on user criteria, "best fit" may include, for example, the shortest stopping distance, shortest stopping time, or a minimized combination of the two for either overall stopping (i.e. worst joint) or defined on a joint-by-joint basis. Other 'best fit' criteria could be defined by the user for filtering results of multi-model selection, such as but not limited to minimum complexity to reduce computational latency, or accuracy of the model over a selectable confidence interval. The predetermined motions may take into account complexities such as singularities or near-singularity conditions of the specific robot version; these are contained in the database 110.

In one embodiment, the database 110 is conceptually organized as a table whose rows each correspond to a trajectory label, and with columns corresponding to entries within various categories relevant to model selection. Each trajectory label may index a file containing basic parameters for the trajectory. Each cell of the table may be unoccupied (indicating that the trajectory is irrelevant to the column label or unperformable by the robot specified by the column label), checked as relevant, or may contain additional data relevant to the trajectory. For example, a trajectory label may specify a circular end-effector path of radius 4 cm. A particular cell along that row may further specify, for example, a speed or arm azimuth angle at which the circular motion is to take place.

Columns may include label categories such as robot model, robot version (with each column in this category specifying a commercially available robot or robot arm), application (welding, placing, joining, etc.), specific test criteria (e.g., stopping distance for a heavy payload, which may be best tested by particular trajectories), type of workpiece, type of end effector, dress package, etc. Suppose, for example, that a user specifies both a robot version and an application. The selection module 135 may identify one or more models compatible with the specified robot version, and these models will be associated with various trajectories in the table. The selection module 135 may further determine whether the table has a column entry for the specified application, and if so, non-duplicative trajectories (including any data specified in the table cells) may be added to list of trajectories that the E-T module 137 will command the robot under study to perform. Depending on the selected application, the selection module may, via the display 112, solicit additional information from the user, such as the payload weight. This additional parameter may be used to computationally modify aspects of the trajectories to be performed, either analytically (e.g., based on a formula stored in the cell specified by a particular trajectory and application combination) or because the table includes multiple columns, each corresponding to a payload weight range, for a particular application.

More simply, a relational database may specify base robot models, applications, and trajectories, and the selection module 135 may select among options to create a a model for a new application on which the robot has not previously been tested.

The monitoring module 140 can either monitor the real-time outputs of the robot (joint velocities and positions) from the robot controller 148, or may instead capture the robot joint positions from a motion-capture system (such as cameras, accelerometers, sensors 148, or other mechanisms combined with suitable computer-vision capabilities) installed on the workcell space. The motion-capture system can be used as the primary means of determining the robot joint positions or as a validation to the real-time data interface from the robot controller.

The parameter solver 150 processes data from the monitoring module 140 into the desired output, i.e., system identification. In particular, the parameter solver 150 receives timestamped data from the monitoring module 140 and, based thereon, generates numerical estimates of the dynamic model parameters, which may be coefficients of a set of differential or difference equations describing joint dynamics, or parameters describing the overall dynamic model of the robot with associated confidence intervals. These numerical estimates can be presented graphically via the display 112 or in tabular format and can be used as input to the E-T module 137 to improve robot performance. Given the now-complete dynamic model of the robot system, the parameter module 150 (or a more specialized module) can produce complete stopping distance curves for specific applications and combinations of robot arm, payload, end effector, and dress package. These calculations are more meaningful than generic parameters for particular applications involving specified payloads (e.g., multiple payloads), robot motions, and robot arm extensions, and reduce the hazard zone in speed-and-separation monitoring calculations below what is typically provided by safety-rated applications intended for a generic system, because in effect the robot has been characterized for the application of interest. The system-identification data or portion thereof (e.g., stopping times) may also be stored in the robot or its controller, e.g., in a safety-rated part of the control system per ISO 13849 or IEC 62061 standards, to govern robot operation.

Certain embodiments of the present invention are described above. It is, however, expressly noted that the present invention is not limited to those embodiments; rather, additions and modifications to what is expressly described herein are also included within the scope of the invention.

What is claimed is:

1. A system for generating a system identification for a robotic system, the system comprising:
   a. a processor;
   b. a memory including instructions executable by the processor for providing:
      1) an excitation-trajectory module for generating a set of robot motions and causing the robotic system to physically execute the set of robot motions;
      2) a monitoring module for monitoring the physical execution of the robot motions by the robotic system; and
      3) a parameter solver, responsive to the excitation-trajectory module, for numerically estimating dynamic model parameters for the robot based on the monitored physical execution; and
   c. a controller for controlling the robotic system in accordance with a safety constraint by operating the robotic system based on the estimated dynamic model parameters.

2. The system of claim 1, further comprising a database of robot kinematic and dynamic models and associated robotic systems, wherein (i) the memory further comprises instructions executable by the processor for providing a selection module configured to receive at least one robot characteristic selected from an identification of the robotic system, a type of workpiece, a type and/or model of end effector, or a robot dress package and, based on the at least one robot characteristic, identify a robot model from the database and (ii) the controller is configured to operate the robotic system based on the identified robot model and the estimated dynamic model parameters.

3. The system of claim 1, further comprising an input module for receiving and timestamping data from the controller and external sensors monitoring operation of the robotic system, the monitoring system being responsive to the input module.

4. The system of claim 1, wherein the parameter solver is further configured to output dynamic model parameters to a safety-rated portion of the robot controller.

5. The system of claim 1, wherein the excitation-trajectory module is configured to monitor the execution of the robot motions by the robotic system by monitoring real-time outputs thereof.

6. The system of claim 1, further comprising a motion capture system, the monitoring module being configured to monitor the execution of the robot motions by the robotic system via the motion capture system.

7. The system of claim 1, wherein the excitation-trajectory module is further configured to select from among a plurality of robot models identified by the selection module based on the monitored execution of the robot motions.

8. A method of computationally generating a system identification for a robotic system, the method comprising the steps of:
   causing the robotic system to physically execute a set of robot motions;
   monitoring the physical execution of the robot motions by the robotic system;
   based on the monitored physical execution, numerically estimating dynamic model parameters for the robotic system; and
   enforcing a safety constraint by operating the robotic system in accordance with a robot model based on the estimated dynamic model parameters.

9. The method of claim 8, further comprising the steps of receiving at least one robot characteristic selected from an identification of the robot, a type of workpiece, a type and/or model of end effector, or a robot dress package and, based on the at least one robot characteristic, identifying a kinematic and dynamic model from a database of different robot kinematic and dynamic models each characterizing dynamics associated with a robotic system, and operating the robotic system in accordance with the identified robot model and the estimated dynamic model parameters.

10. The method of claim 8, further comprising the step of receiving and timestamping data from the controller and external sensors monitoring operation of the robotic system.

11. The method of claim 8, wherein real-time outputs of the robotic system are monitored.

12. The method of claim 8, further comprising the step of monitoring the execution of the robot motions using a motion capture system.

13. The method of claim 8, further comprising the step of producing stopping distance curves for the specified robot application based on the dynamic model parameters and at least one robot characteristic.

14. The method of claim 13, further comprising the step of receiving and storing a user-specified robot application, the one or more robot models being identified at least in part based on the user-specified robot application.

15. The method of claim 8, wherein the set of robot motions is generated based at least in part on a user-specified robot application.

16. The method of claim 8, wherein the set of robot motions is generated based at least in part on one or more user-specified trajectories.

17. The method of claim 8, wherein the set of robot motions is generated based at least in part on one or more user-specified system-identification criteria.

18. The method of claim 8, wherein the one or more robot models is identified based at least in part on the monitored execution of the robot motions.

* * * * *